US006253997B1

(12) United States Patent
Inaoka et al.

(10) Patent No.: US 6,253,997 B1

(45) Date of Patent: Jul. 3, 2001

(54) AUTOMATED TELLER'S MACHINE AND METHOD THEREOF

(75) Inventors: Mayumi Inaoka, Machida; Yoshi Onawa; Yoshiyuki Ozaki, both of Kawasaki, all of (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/670,398

(22) Filed: Sep. 27, 2000

(30) Foreign Application Priority Data

Oct. 26, 1999 (JP) ........................................ 11-303548

(51) Int. Cl.[7] ........................................ G06F 17/60

(52) U.S. Cl. ........................................ 235/379; 902/12

(58) Field of Search ........................................ 235/379; 902/12

(56) References Cited

U.S. PATENT DOCUMENTS 6,006,989 * 12/1999 Ademmer et al. .................... 902/12

FOREIGN PATENT DOCUMENTS 6-96330 4/1994 (JP) .
6162315 * 6/1994 (JP) .
11-66200 3/1999 (JP) .

* cited by examiner

*Primary Examiner*—Harold I. Pitts

(74) *Attorney, Agent, or Firm*—Armstrong, Westerman, Hattori, McLeland & Naughton, LLP

(57) ABSTRACT

A user interface unit transmits a user's instruction to a main control unit. The main control unit generates control data according to the user's instruction and an instruction from a host and transmits the control data to a cash input/output unit. A cash output control unit in the cash input/output unit withdraws cash from a safe based on the control data and outputs the cash. The encryption process unit of the main control unit encrypts the control data. The encryption process unit of the cash input/output unit decrypts the encryption data encrypted by the encryption process unit of the main control unit and reproduces the original control data. Mutual authorization is performed between the main control unit and cash input/output unit.

12 Claims, 14 Drawing Sheets

AUTOMATED TELLER'S MACHINE AND METHOD THEREOF

BACKGROUND OF THE INVENTION

1. Field of the Invention

The present invention relates to an automated teller's machine and in particular, relates to the security of the automated teller's machine.

2. Description of the Related Art

An automated teller's machine is installed at a variety of places, such as banks, post offices, convenience stores, stations, airports, etc., and a variety of transactions, such as deposit transactions, payment transactions, transfer transactions, exchange transactions, etc., are conducted according to a user's operation.

FIG. 1 shows an example configuration of a conventional automated teller's machine. The automated teller's machine 100 comprises a user interface unit 101, a main control unit 102 and a cash input/output unit 103.

The user interface unit 101 transmits the operation and instruction of a user to the main control unit 102 and provides the user with transaction-related information according to the instruction of the main control unit 102. The main control unit 102 performs a transaction according to a user's instruction and gives an instruction to the cash input/output unit 103 based on the transaction result. The main control unit 102 transmits/receives information related to the transaction to/from a host 111, if necessary. The cash input/output unit 103 outputs an amount of cash requested by a user or collects an amount of cash inputted by a user according to the instruction of the main control unit 102.

The operation of the automated teller's machine 100 is briefly described next. Here, a case where a user-A withdraws 5,000 yen is described as an example.

When withdrawing cash from the automated teller's machine 100, the user-A first selects "Withdraw cash" for a transaction to be performed. Then, the user-A inserts a cash card, credit card, etc. (hereinafter collectively called a cash card), inputs his or her password and inputs information about an amount of cash to be withdrawn, according to the guidance of the user interface unit 101.

The main control unit 102 notifies the host 111 of information for identifying the inserted cash card and other pieces of information inputted by the user-A. The host 111 judges whether the user-A is the authorized holder of the inserted cash card and whether the transaction requested by user-A is allowable. Then, the host 111 provides the main control unit 102 of the automated teller's machine 100 with an instruction corresponding to the judgment result.

It is assumed here that the user-A is the authorized holder of the cash card and the deposit balance of the account of the user-A is 5,000 yen or more. In this case, the main control unit 102 instructs the cash input/output unit 103 to "Output 5,000 yen". On receipt of this instruction, the cash input/output unit 103 outputs 5,000 yen. At this time, the user interface unit 101 issues a receipt relating to this transaction.

When a transaction is performed using an automated teller's machine, as a matter of course, security is a key factor. For this purpose, information transmitted/received between the automated teller's machine 100 and the host 111 is usually encrypted. In particular, if a network 112 is configured using a public network, complex cryptography is needed.

An existing automated teller's machine is usually developed for the exclusive use of each bank. Under these circumstances, the format, etc., of data in each automated teller's machine is not made public. Therefore, even if information used in an automated teller's machine is stolen, it is difficult to understand the contents and it is also difficult to alter the data. For that reason, the existing automated teller's machine was not generally provided with a special function to prevent information used in the machines from being stolen and altered.

However, recently standardization has also been promoted in the field of an automated teller's machine. As one architectural standard of an automated teller's machine, for example, a WOSA (Windows (TM) Open Service Architecture) Extensions for Financial Services "Cash Dispenser Device Class Service Provider Implementation Specification" is known.

In this way, the architecture of an automated teller's machine is standardized and the format, etc., of data used in the machine becomes widely known. Therefore, if information used in the automated teller's machine is stolen, the contents can easily be decoded and the data can also be altered.

For example, if as shown in FIG. 1, the user-A instructs "Withdraw 5,000 yen", the main control unit 102 instructs the cash input/output unit 103 to output 5,000 yen. In this case, the cash input/output unit 103 outputs 5,000 yen according to the instruction, and the host 111 reduces the deposit amount of user-A's account by 5,000 yen. At this time, if the information provided from the main control unit 102 to the cash input/output unit 103 is tapped and the information is altered from "Output 5,000 yen" to "Output 50,000 yen", the cash input/output unit 103 outputs 50,000 yen instead of 5,000 yen according to the altered information. In this case, the host 111 reduces the deposit amount of user-A's account by only 5,000 yen. As a result, the bank suffers a great loss by the illegal withdrawal.

SUMMARY OF THE INVENTION

An object of the present invention is to improve the security against the tapping and alteration of information used in the automated teller's machine.

The automated teller's machine of the present invention comprises a control unit and a cash output unit, and outputs cash according to a given instruction. The control unit generates control data including information for indicating an amount of cash to be withdrawn according to the given instruction. The output unit stores cash and outputs cash based on the control data generated by the control unit. Mutual authorization is performed between the control unit and output unit.

If in the above-described configuration, at least one of the control unit and the output unit is illegally replaced with another device, the mutual certification fails. The automated teller's machine is, for example, designed in such a way that the subsequent transaction cannot be performed if the above-described mutual authorization fails. Therefore, if at least one of the control unit and the output unit is illegally replaced with another device, the automated teller's machine ceases the subsequent transactions. Accordingly, the security of the automated teller's machine is improved.

Another aspect of the automated teller's machine comprises the above-described control unit and output unit, and the above-described control data are encrypted according to a predetermined algorithm when being transmitted from the control unit to the output unit.

If the control data to be transmitted from the control unit to the output unit are encrypted, the contents cannot be easily analyzes and the data cannot be altered, even if information used in the automated teller's machine is tapped. Accordingly, security can be improved.

The above-described automated teller's machine can also be configured in such a way that a key for the above-described encryption can be modified based on a parameter used inside the apparatus. Generally speaking, in a system where a key for encryption is periodically or non-periodically modified, complex cryptography is implemented. Accordingly, the security of the automated teller's machine can be further improved.

BRIEF DESCRIPTIONS OF THE DRAWINGS

DESCRIPTION OF THE PREFERRED EMBODIMENTS

The preferred embodiments of the present invention are described below with reference to the drawings.

Figure 1:
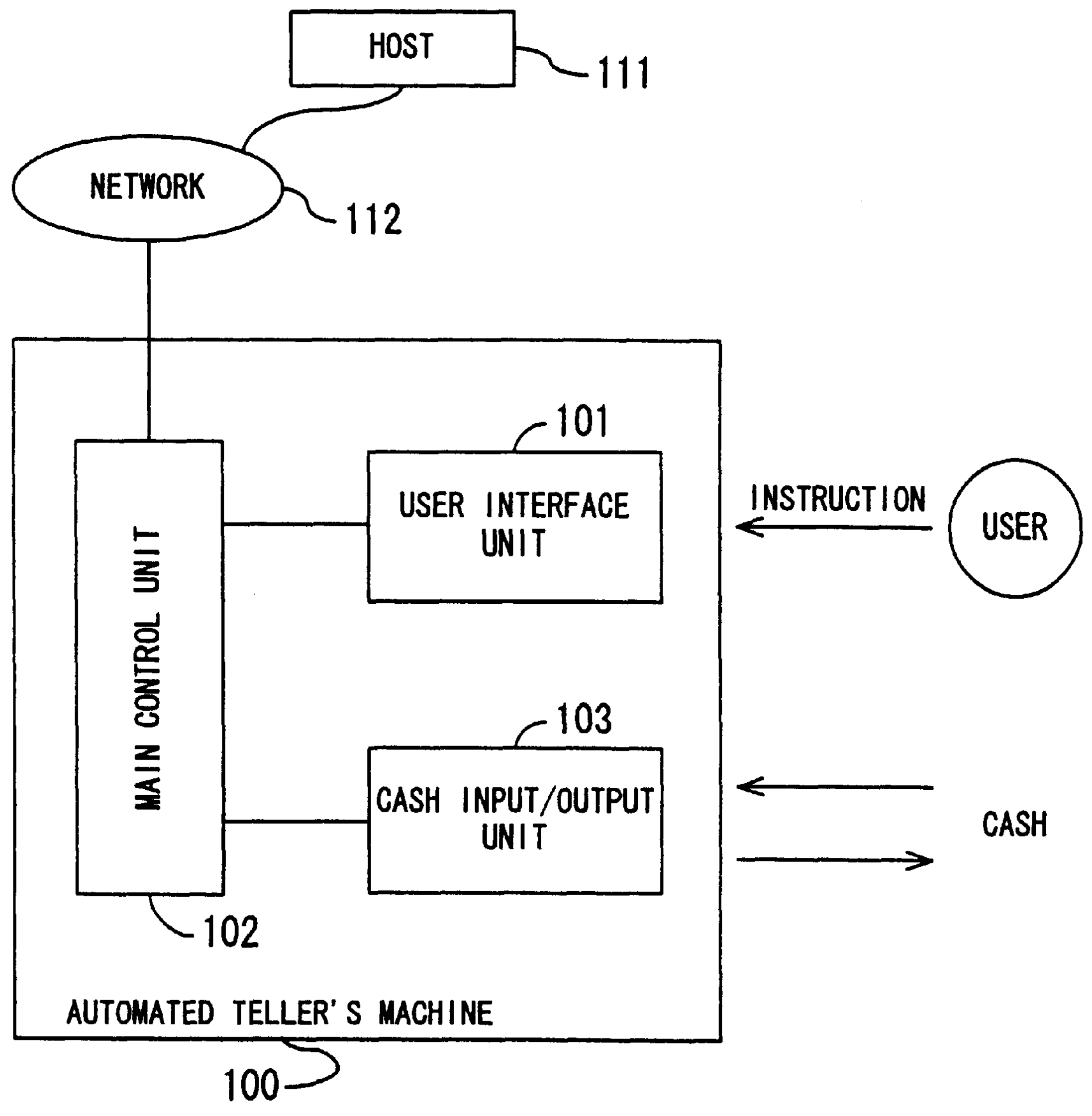
FIG. 1 shows an example configuration of the conventional automated teller's machine.
Figure 2:
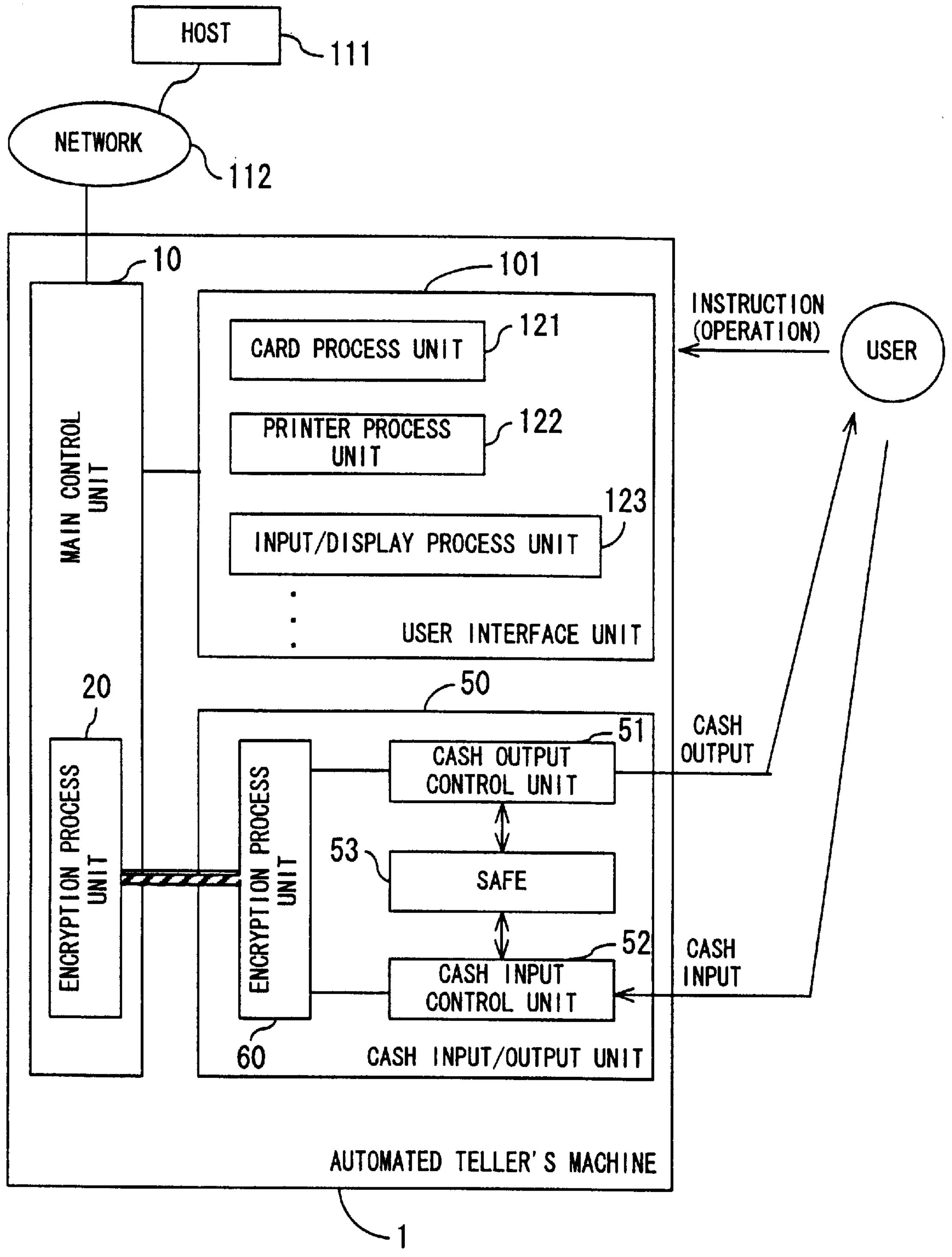
FIG. 2 shows the configuration of one preferred embodiment of the automated teller's machine of the present invention.

FIG. 2 shows the configuration of one preferred embodiment of the automated teller's machine of the present invention. The automated teller's machine 1 comprises a user interface unit 101, a main control unit 10 and a cash input/output unit 50. The automated teller's machine 1 is connected to a host 111 via a network 112. The host 111 includes a database for storing customer information (including information for managing the account of each customer).

For the user interface unit 101, an existing user interface unit can be used without modification, and includes a card process unit 121, a printer process unit 122 and an input/display process unit 123.

The card process unit 121 reads identification information recorded in a cash card, credit card, IC card, etc. (hereinafter collectively called a "cash card"), which is inserted by a user (which is not necessarily limited to a human being), and transmits the identification information to the main control unit 10. The printer process unit 122 writes the result of financial transaction performed by the automated teller's machine 1 in a transaction receipt or a passbook (bankbook) according to the instruction of from main control unit 10. The input/display process unit 123 displays guidance information for operation procedures required when a transaction is performed using the automated teller's machine 1, and receives user's instructions inputted by a user according to the guidance. Then, the input/display process unit 123 transmits user's instructions to the main control unit 10.

The main control unit 10 performs a transaction according to a user's instruction, and provides the cash input/output unit 50 with the instruction based on the transaction result. The main control unit 10 transmits/receives information related to the transaction to/from the host 111, if necessary. The main control unit 10 further includes an encryption process unit 20. The encryption process unit 20 encrypts data to be transmitted from the main control unit 10 to the cash input/output unit 50. In addition, if received data from the cash input/output unit 50 are encrypted, the encryption process unit 20 decrypts the encrypted data.

The cash input/output unit 50 outputs cash according to an instruction from the main control unit 10, and also collects cash inputted by a user. The cash input/output unit 50 includes an encryption process unit 60, a cash output control unit 51, a cash input control unit 52 and a safe 53.

The encryption process unit 60 decrypts the encrypted data from the encryption process unit 20 of the main control unit 10. In addition, the encryption process unit 60 encrypts data to be transmitted from the cash input/output unit 50 to the main control unit 10, if necessary.

The cash output control unit 51 takes out cash from the safe 53 and outputs the cash according to an instruction from the main control unit 10. The cash input control unit 52 is provided with a function to read and recognize cash inputted by a user, and transmits the recognition result to the main control unit 10. The cash input control unit 52 also collects the cash inputted by a user in the safe 53.

Both the encryption process unit 20 provided in the main control unit 10 and the encryption process unit 60 provided in the cash input/output unit 50 authorize the cash input/output unit 50 and the main control unit 10, respectively, under a cooperative operating. Here, a cryptography code or method used by the encryption process units 20 and 60 is not limited to a specific cryptography.

In this way, when the automated teller's machine 1 performs a financial transaction according to a user's operation, information to be transmitted between the main control unit 10 and the cash input/output unit 50 is encrypted. Therefore, even if the information transmitted between the main control unit 10 and the cash input/output unit 50 is tapped, it is difficult to understand and alter the contents of the information.

If the main control unit 10 and cash input/output unit 50 were incorporated to remove a transmission line between them, data transmitted between the main control unit 10 and cash input/output unit 50 could be prevented from being tapped and altered. However, generally speaking, since the cash output control unit 51, cash input control unit 52 and safe 53 are independent units and the main control unit 10 is a circuit substrate on which a lot of ICs are mounted, it is difficult to incorporate the main control unit 10 and cash input/output unit 50. Thus, the existence of some kind of transmission line between the main control unit 10 and cash input/output unit 50 cannot be avoided, and as a result, there remains risk that data may be tapped. Specifically, if a tapping device is set inside the automated teller's machine, there is a possibility that data may be tapped and altered.

The automated teller's machine 1 of the present invention has solved the above-described problem by encrypting information used inside the machine. In other words, even if a tapping device is set inside the automated teller's machine 1, illegal transactions can be prevented from being performed.

The preferred embodiment of the automated teller's machine is described in detail below. Here, the configuration and operation related to a function to output cash according to a user's instruction is mainly described.

Figure 3:
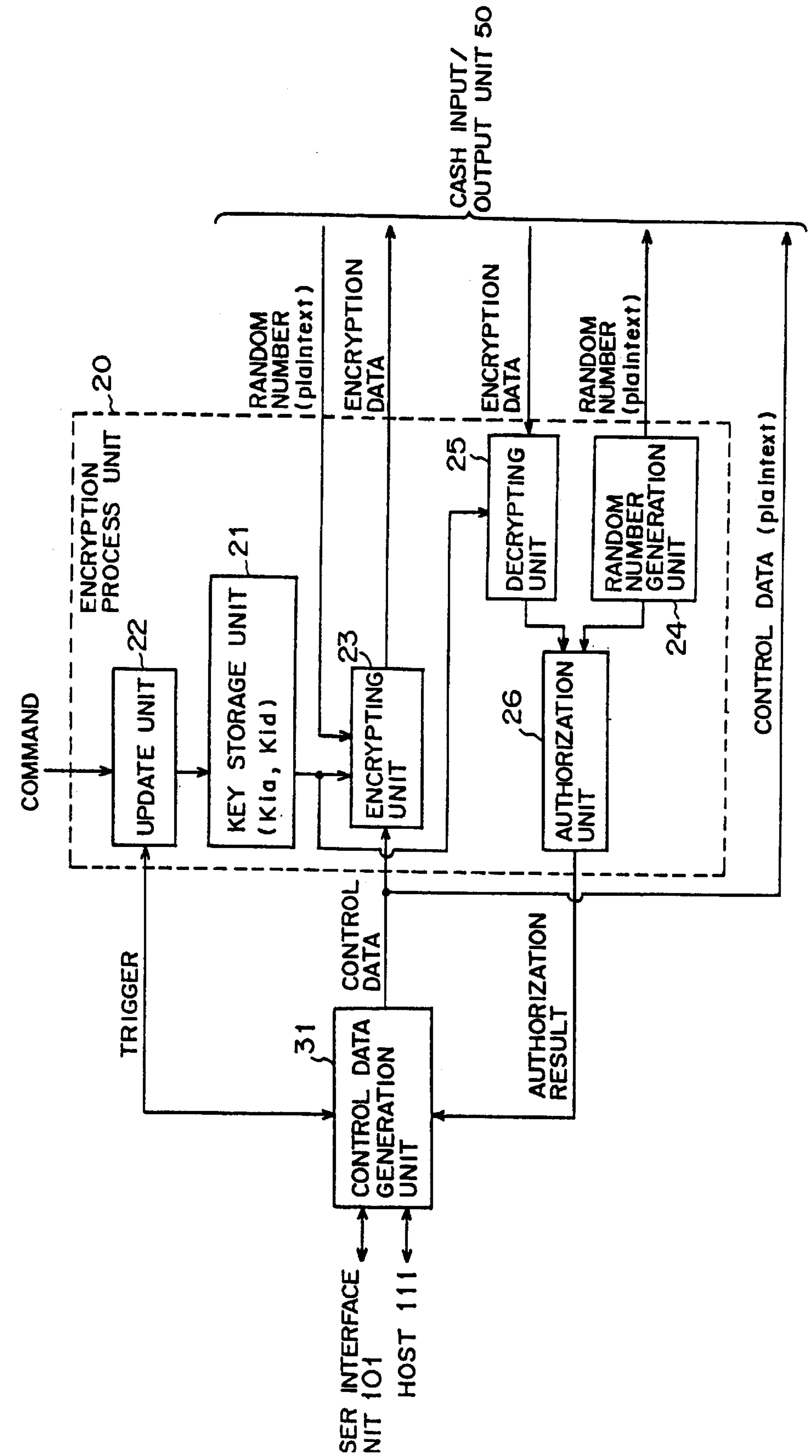
FIG. 3 shows the configuration of the encryption unit provided in the main control unit.

FIG. 3 shows the configuration of the encryption process unit 20 provided in the main control unit 10. The encryption process unit 20 can be implemented by software or by the combination of software and hardware.

A key storage unit 21 stores initial keys used in an encryption process. If the automated teller's machine 1 adopts a secret key cipher system, the key storage unit 21 stores both an initial key Kia, which is an initial key for the main control unit 10 and an initial key Kib, which is an initial key for the cash input/output unit 50. An update unit 22 updates the initial keys stored in the key storage unit 21 based on a parameter used inside the automated teller's machine 1.

An encrypting unit 23 encrypts control data generated by a control data generation unit 31 using the initial keys stored in the key storage unit 21. This encryption data are transmitted to the cash input/output unit 50. The encrypting unit 23 encrypts a random number transferred from the cash input/output unit 50 using the initial keys stored in the key storage unit 21 and returns the encrypted random number to the cash input/output unit 50. The "control data" are described in detail later.

A random number generation unit 24 generates a different random number each time mutual authorization is performed according to a predetermined algorithm. The random number generated by the random number generation unit 24 is transmitted to the cash input/output unit 50 and simultaneously is provided to an authorization unit 26. A decrypting unit 25 decrypts the encryption data transmitted from the cash input/output unit 50 using the initial keys stored in the key storage unit 21. This encryption data are obtained by encrypting the random number generated by the random number generation unit 24 in the cash input/output unit 50.

The authorization unit 26 compares the output of the random number generation unit 24 with the output of the decrypting unit 25 and judges whether the cash input/output unit 50 is legal. If the above-described two outputs match, the authorization unit 26 outputs information indicating that the cash input/output unit 50 is legal, and if the two outputs do not match, the authorization unit 26 outputs information indicating that the cash input/output unit 50 is illegal.

The control data generation unit 31 generates control data according to a user's instruction provided via the user interface unit 101 and an instruction provided by the host 111. If the authorization unit 26 judges that the cash input/output unit 50 is illegal, the control data generation unit 31 stops outputting the generated data. The control data generation unit 31 is provided in the main control unit 10.

Figure 4:
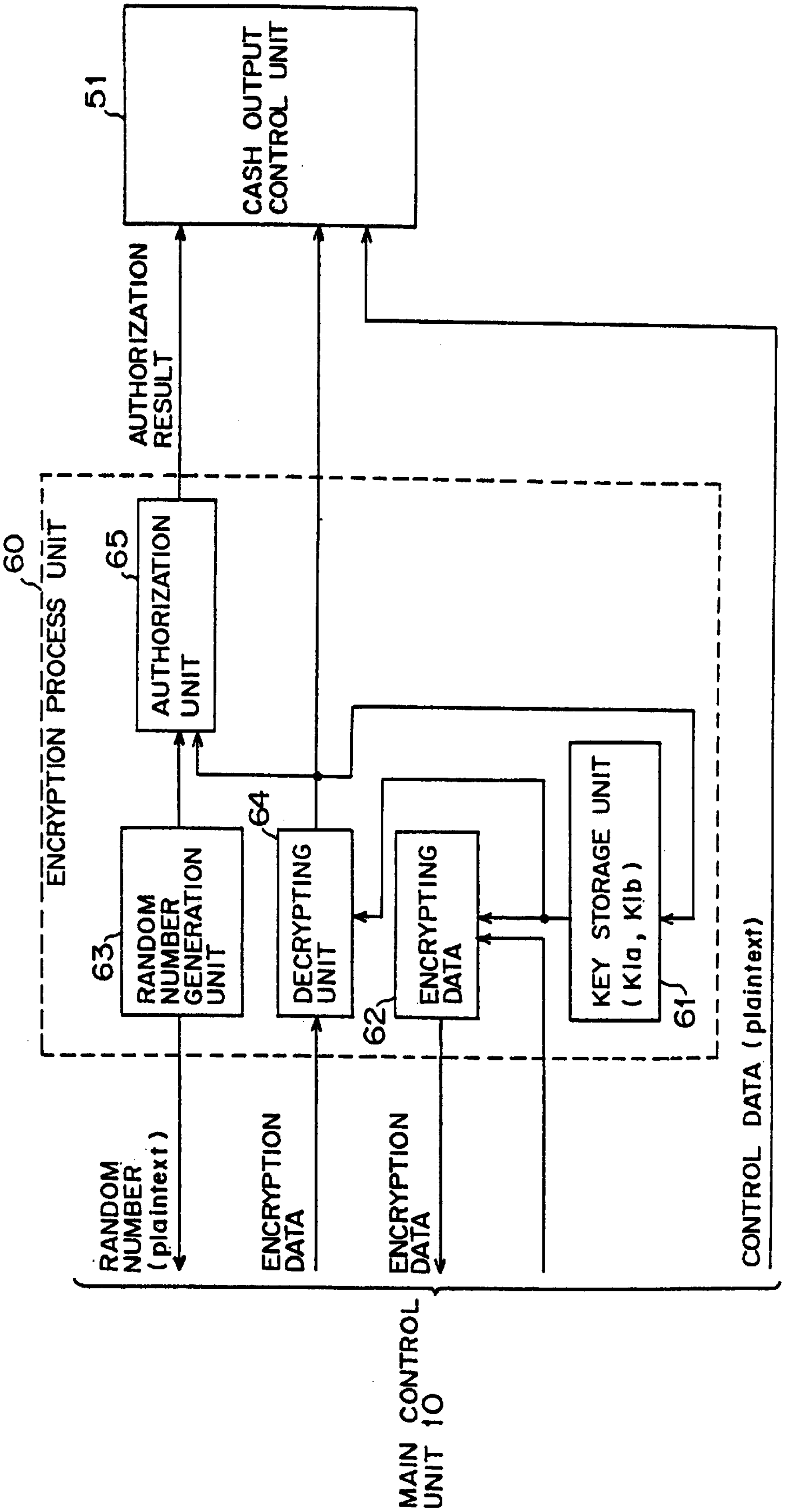
FIG. 4 shows the configuration of the encryption unit provided in the cash input/output unit.

FIG. 4 shows the configuration of the encryption process unit 60 provided in the cash input/output unit 50. The encryption process unit 60 can be implemented by software or by the combination of software and hardware, like the encryption process unit 20.

The configuration of the encryption process unit 60 is similar to the configuration of the above-described encryption process unit 20. A key storage unit 61 stores keys used in an encryption process. If a secret key cipher system is adopted, the key storage unit 61 stores the same initial keys as stored in the key storage unit 21. If the initial keys stored in the key storage unit 21 are updated by the update unit 22, the initial keys stored in the key storage unit 61 are also synchronously updated. This update method of the initial keys is described later.

An encrypting unit 62 encrypts a random number transferred from the main control unit 10 using the initial keys stored in the key storage unit 61 and returns the encrypted random number to the main control unit 10. A random number generation unit 63 generates a different random number each time mutual authorization is performed according to a predetermined algorithm. The random number generated by the random number generation unit 63 is transmitted to the main control unit 10 and simultaneously is provided to an authorization unit 65.

A decrypting unit 64 decrypts the encryption data transmitted from the main control unit 10 using the initial keys stored in the key storage unit 61. Here, when encryption data obtained by encrypting the random number generated by the random number generation unit 63 in the main control unit 10 are provided, the decrypting unit 64 transmits the decryption result to the authorization unit 65. However, when encryption data obtained by encrypting the control data generated by the control data generation unit 31 are provided, the decrypting unit 64 transmits the decryption result to a cash output control unit 51.

The authorization unit 65 compares the output of the random number generation unit 63 with the output of the decrypting unit 64 and judges whether the main control unit 10 is legal. If the above-described two outputs match, the authorization unit 65 outputs information indicating that the main control unit 10 is legal. If the two outputs do not match, the authorization unit 65 outputs information indicating that the main control unit 10 is illegal.

The output control unit 51 takes out cash from the safe 53 and outputs the cash according to the control data decrypted by the decrypting unit 64. However, if the authorization unit 65 judges that the main control unit 10 is illegal, then the output control unit 51 subsequently does not operate according to the control data.

In the automated teller's machine 1, mutual authorization is performed between the main control unit 10 and cash input/output unit 50 prior to the performing of an actual financial transaction. Specifically, the main control unit 10 checks whether the cash input/output unit 50 is legal, and the cash input/output unit 50 checks whether the main control unit 10 is legal.

Figure 5A:
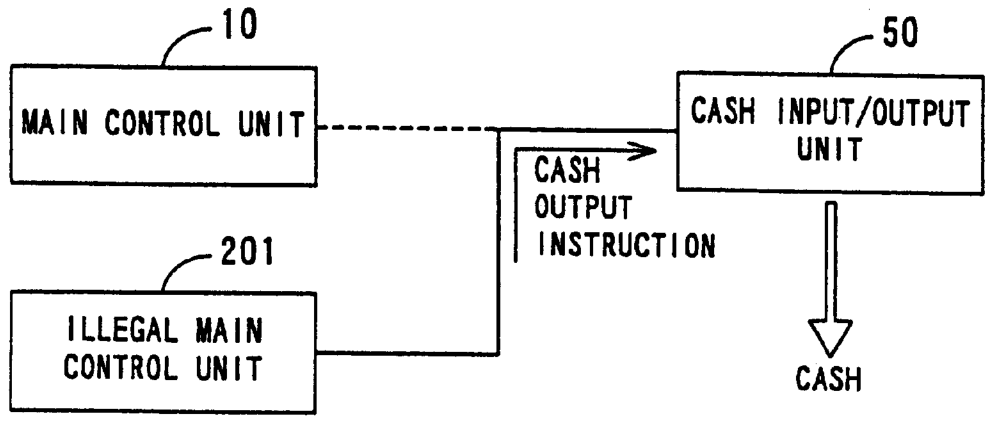
FIG. 5A shows the illegal transaction in the case where an illegal main control unit is installed.
Figure 5B:
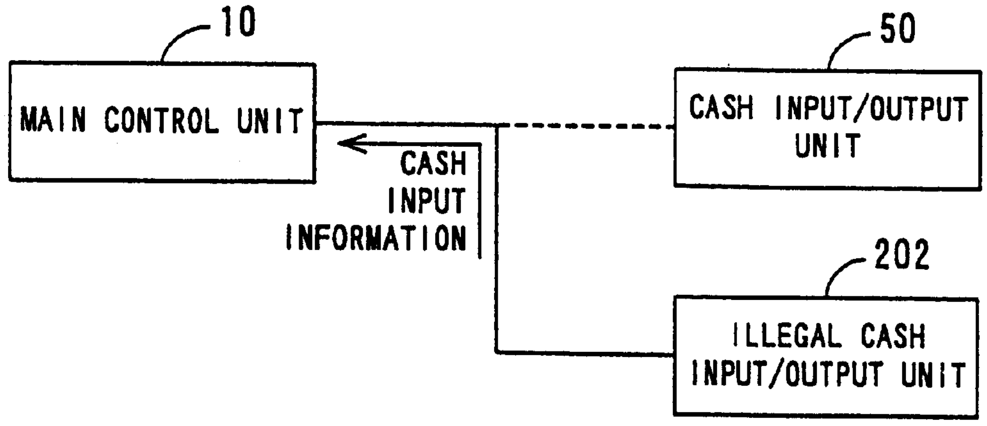
FIG. 5B shows the illegal transaction in the case where an illegal cash input/output unit is installed.

It is important to perform mutual authorization. For example, as shown in FIG. 5A, it is assumed that the main control unit 10 is replaced with an illegal unit (illegal main control unit 201). In this case, if an illegal instruction is generated by the illegal main control unit 201, there is a possibility that the cash input/output unit 50 may output cash according to the illegal instruction. In addition, as shown in FIG. 5B, it is assumed that the cash input/output unit 50 is replaced with an illegal unit (illegal cash input/output unit 202). In this case, for example, if information indicating an inputted amount of cash is transmitted from the illegal cash input/output unit 202 to the main control unit 10, the main control unit 10 notifies the host 111 of the information. In other words, there is a possibility that the deposit amount of a specific account may be rewritten by this illegal information. The automated teller's machine 1 of this preferred embodiment performs mutual authorization in order to prevent such illegal transaction from being performed.

Figure 6:
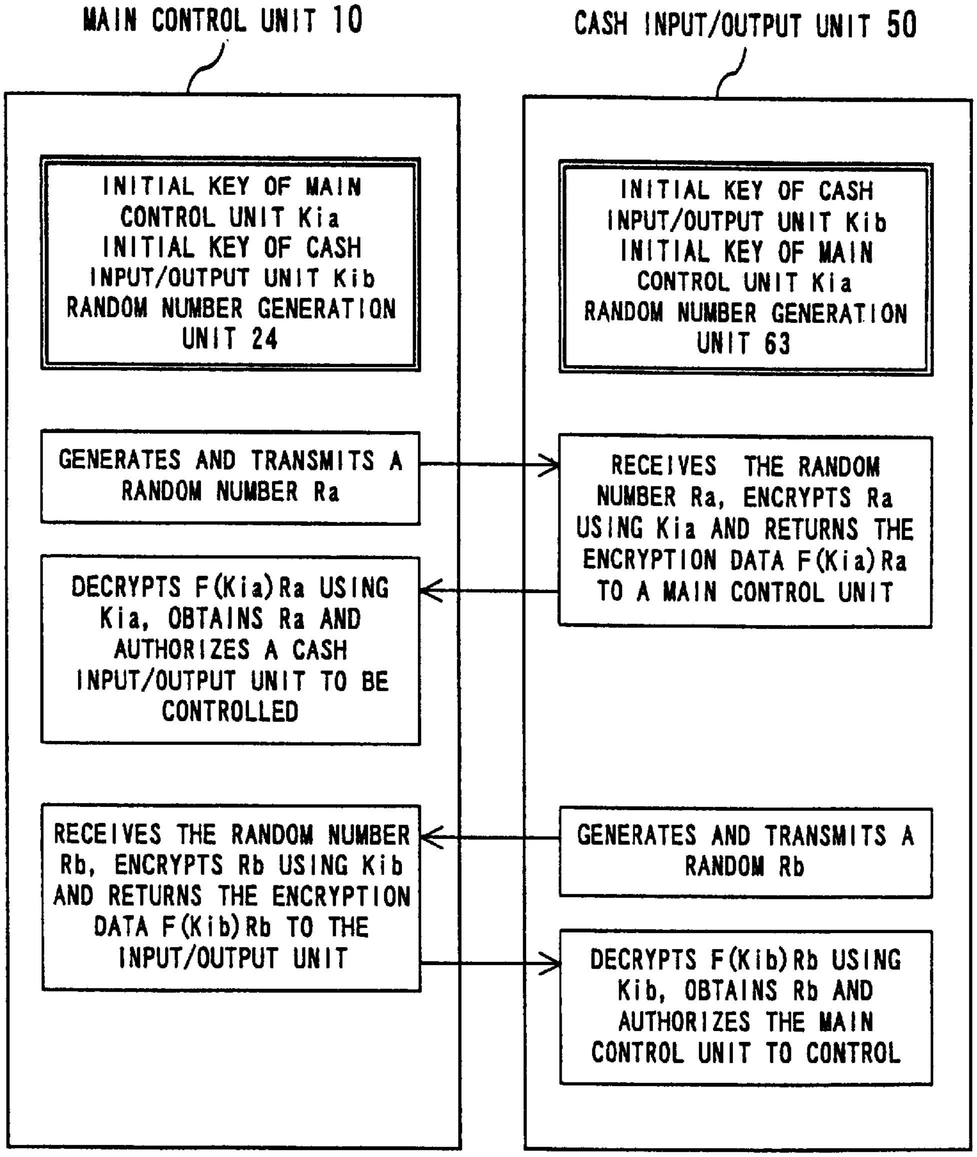
FIG. 6 shows mutual authorization procedures using a secret key cipher system.

FIG. 6 shows the procedures for mutual authorization by the main control unit 10 and cash input/output unit 50. This example shows a case where the automated teller's machine 1 adopts a secret key cipher system. A secret key cipher system includes, for example, a DES, FELA and IDEA.

Both the main control unit 10 and cash input/output unit 50 store both the initial keys Kia and Kib. The initial key Kia is the initial key of the main control unit 10, and the initial key Kib is the initial key of the cash input/output unit 50. The main control unit 10 and cash input/output unit 50 are provided with the random number generation units 24 and 63, respectively.

The sequence of a process of authorizing a cash input/output unit 10 is as follows. That is, first, the main control unit 10 generates a random number Ra and transmits the random number Ra to the cash input/output unit 50 without encryption. This random number Ra is generated by the random number generation unit 24.

On receipt of the random number Ra transmitted from the main control unit 10, the cash input/output unit 50 encrypts the random number Ra using the initial key Kia. It is assumed in this example that the encryption data obtained by encrypting the random number Ra using the initial key Kia is expressed as "F(Kia)Ra". "F" is an encryption function. The cash input/output unit 50 transmits the encryption data F(Kia)Ra to the main control unit 10. The initial key Kia is stored in the key storage unit 61 shown in FIG. 4.

On receipt of the encryption data F(Kia)Ra, the main control unit 10 decrypts the encryption data using the initial key Kia. This initial key Kia is stored in the key storage unit 21 shown in FIG. 3. The decryption result is compared with the random number Ra previously transmitted to the cash input/output unit 50 by the authorization unit 26 shown in FIG. 3. Then, if the above-described decryption result and the random number Ra match, the main control unit 10 judges that the cash input/output unit 50 is legal, and if they do not match, the main control unit 10 judges that the cash input/output unit 50 is illegal.

A process of authorizing the main control unit 10 is basically the same as the above-described process of authorizing the cash input/output unit 50. Specifically, the cash input/output unit 50 generates a random number Rb and transmits the random number Rb to the main control unit 10 without encryption. This random number Rb is generated by the random number generation unit 63.

On receipt of the random number Rb transmitted from the cash input/output unit 50, the main control unit 10 encrypts the random number Rb using the initial key Kib. It is assumed in this example that the encryption data obtained by encrypting the random number Rb using the initial key Kib is expressed as "F(Kib)Rb". The main control unit 10 transmits the encryption data F(Kib)Rb to the cash input/output unit 50. The initial key Kib is stored in the key storage unit 24 shown in FIG. 3.

On receipt of the encryption data F(Kib)Rb, the cash input/output unit 50 decrypts the data using the initial key Kib. This initial key kib is stored in the key storage unit 61 shown in FIG. 4. The decryption result is compared with the random number Rb previously transmitted to the main control unit 10 by the authorization unit 65 shown in FIG. 4. Then, if the above-described decoding result and the random Rb match, the cash input/output unit 50 judges that the main control unit 10 is legal. On the other hand, if they do not match, the cash input/output unit 50 judges that the main control unit 10 is illegal.

Figure 7:
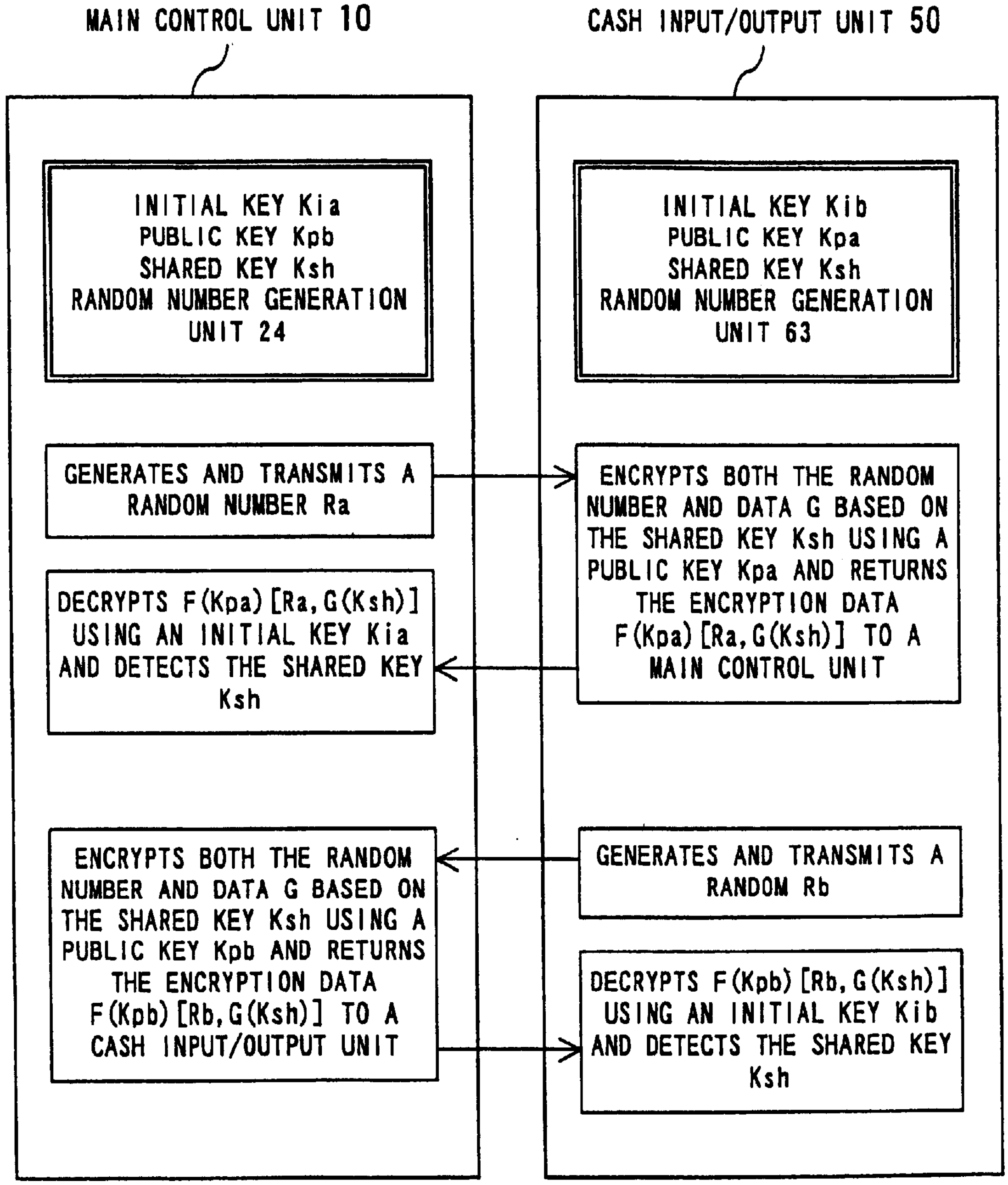
FIG. 7 shows mutual authorization procedures using a public key cipher system.

FIG. 7 shows the procedures of mutual authorization by the main control unit 10 and cash input/output unit 50 using a public key cipher system. The public key cipher system is, for example, an RSA.

The main control unit 10 has an initial key Kia, the public key Kpb of the cash input/output unit 50 and a shared key Ksh. The cash input/output unit 50 has an initial key Kib, the public key Kpa of the main control unit 10 and a shared key Ksh. The public key Kpa is generated corresponding to the initial key Kia, and the public key Kpb is generated corresponding to the initial key Kib.

The sequence of a process of authorizing a cash input/output unit 50 is as follows. That is, first, the main control unit 10 generates a random number Ra and transmits the random number Ra to the cash input/output unit 50 without encryption. This random number Ra is generated by the random number generation unit 24.

On receipt of the random number Ra transmitted from the main control unit 10, the cash input/output unit 50 encrypts both the random number Ra and data G(Ksh) generated based on the shared key Ksh using the public key Kpa of the main control unit 10. It is assumed in this example that the encryption data obtained by this encryption is expressed as "F(Kpa)[Ra, G(Ksh)]. The cash input/output unit 50 transmits this encryption data F(Kpa) [Ra, G(ksh)] to the main control unit 10.

On receipt of the encryption data F(Kpa) [Ra, G(Ksh)], the main control unit 10 decrypts the encryption data using the initial key Kia. Then, the main control unit 10 checks whether the cash input/output unit 50 has a legal shared key Ksh based on this decryption result. If the cash input/output unit 50 has a legal shared key Ksh, the cash input/output unit 50 is judged to be legal. If the cash input/output unit 50 does not have the legal shared key Ksh, the cash input/output unit 50 is judged to be illegal.

Since a process of authorizing a main control unit 10 is basically the same as the above-described process of authorizing the cash input/output unit 50, the description is omitted here.

As described above, in the automated teller's machine 1, mutual authorization is performed between the main control unit 10 and cash input/output unit 50. This mutual authorization is performed prior to the performing of an actual financial transaction. Specifically, the mutual authorization, for example, can be performed for each financial transaction or at specific intervals. Alternatively, the mutual authorization can be performed if a special incident occurs (for example, when the automated teller's machine 1 starts).

Both the operation of the automated teller's machine 1 and the encryption of information transmitted/received between the main control unit 10 and cash input/output unit 50 are described next. A case where a user withdraws cash of 10,000 yen is described as an example here.

When withdrawing cash from the automated teller's machine 1, a user first selects "Withdraw cash" for a transaction to be performed. Then, the user inserts his cash card according to the guidance of the user interface unit 101 and inputs both his password and information about cash to be withdrawn. "Information about cash to be withdrawn" consists of "Amount information" indicating the amount of cash to be withdrawn and "Information about the number of bills and coins" to be instructed corresponding to the "Amount information". For example, if 10,000 yen is withdrawn, "10,000 yen" is inputted for the "Amount information" and "one 10,000-yen bill" or "ten 1,000-yen bills" is instructed as the "Information about the number of bills and coins".

The main control unit 10 notifies the host 111 of both information for identifying the inserted cash card and information inputted by the user. The main control unit 10 also generates a transaction serial number for identifying each transaction.

The host 111 judges whether the relevant user is the legal holder of the inserted cash card and whether the transaction requested by the user is available, based on the information received from the main control unit 10. Then, the host 111 provides the main control unit 10 of the automated teller's machine 1 with an instruction corresponding to the judgment result. It is assumed in this example that the above-described user is the legal holder of the cash card and that the deposit balance of the account of the user is 10,000 yen or more. In this case, the host 111 transmits an instruction to the automated teller's machine 1 to perform the requested transaction.

On receipt of the above-described instruction from the host 111, the main control unit 10 generates control data to be provided to the cash input/output unit 50. This control data includes "Amount information", "Information about the number of bills and coins" and a "Transaction serial number" and is generated by the control data generation unit 31 shown in FIG. 3.

The main control unit 10 encrypts the control data and transmits the encrypted control data to the cash input/output unit 50. The cash input/output unit 50 reproduces the original control data by decrypting the encrypted data transmitted from the main control unit 10 and operates according to the control data.

Figure 8:
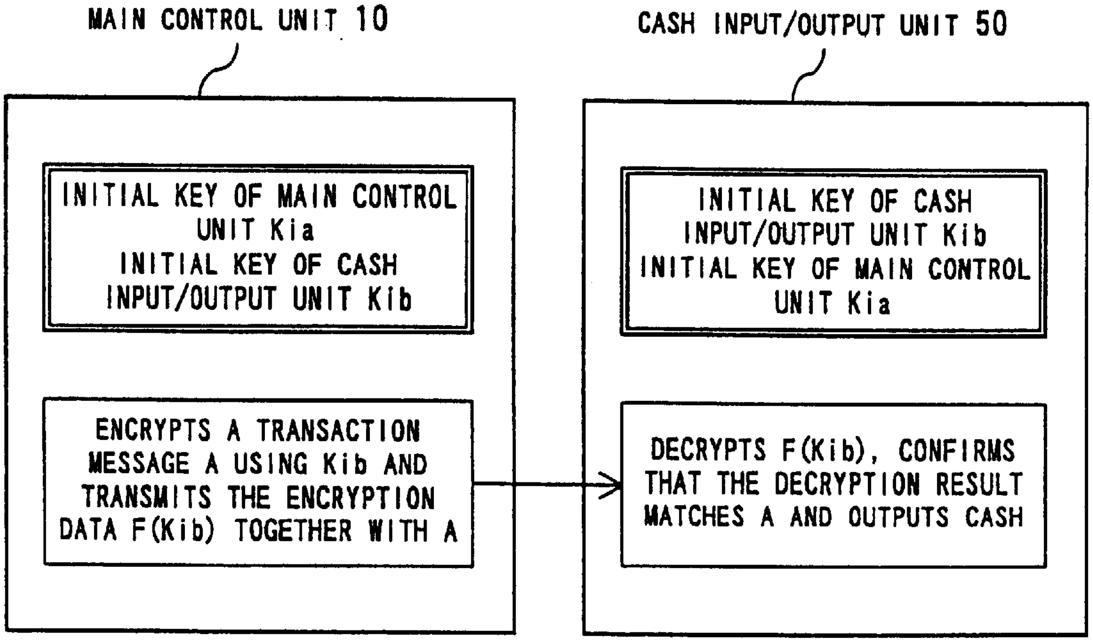
FIG. 8 shows the encryption procedures between the main control unit and the cash input/output unit.

FIG. 8 shows the encryption procedures between the main control unit 10 and cash input/output unit 50 at the time of cash withdrawal. A case where control data (transaction message A) are encrypted and transmitted from the main control unit 10 to the cash input/output unit 50 is shown as an example. Both the main control unit 10 and cash input/output unit 50 store both initial keys Kia and Kib.

The main control unit 10 generates an encryption data F(Kib)A by encrypting the transaction message A using the initial key Kib. This encryption is performed by the encrypting unit 23 shown in FIG. 3. Although in FIG. 8, a secret key cipher system is adopted, the cipher system is not limited to this system, and, for example, a public key cipher system can also be adopted. Then, the main control unit 10 transmits both the transaction message A itself and the encryption data F(Kib)A obtained by encrypting the transaction message A to the cash input/output unit 50.

On receipt of both the transaction message A and the encryption data F(Kib)A, the cash input/output unit 50 decrypts the encryption data F(Kib)A using the initial key Kib. This decryption process is performed by the decrypting unit 64 shown in FIG. 4, and the decryption result is provided to the cash output control unit 51. At this time, the transaction message A is provided to the cash output control unit 51 without modification.

The cash output control unit 51 compares the transaction message A transmitted from the main control unit 10 with the decryption result obtained by decrypting the encryption data F(Kib)A. If the message and the result match, the cash output control unit 51 judges that the transaction message A has not been altered, takes out cash from the safe 53 according to the transaction message A, and outputs the cash. If the above-described two pieces of data do not match, the cash output control unit 51 judges that there is a possibility that the transaction message A maybe altered, and, for example, transmits an error message to the main control unit 10 without accessing the safe 53.

Figure 9:
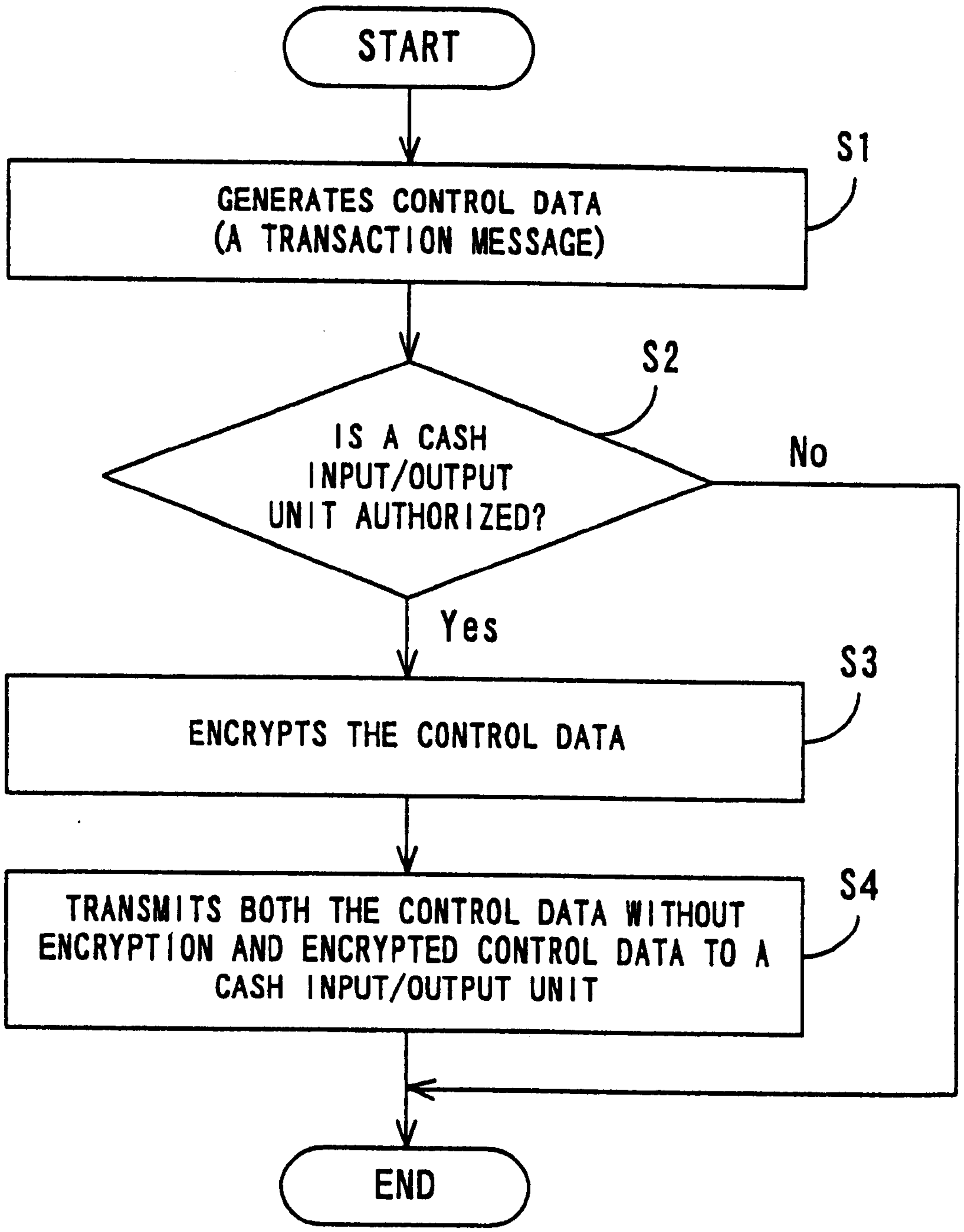
FIG. 9 is a flowchart showing the process of encrypting control data in the main control unit.

FIG. 9 is a flowchart showing the process of the main control unit 10 in the case where control data are encoded. In step S1, control data are generated according to a user's instruction and an instruction given by the host 111. In step S2, it is checked whether the cash input/output unit 50 is correctly authorized. If the cash input/output unit 50 is correctly authorized, in step S3, the control data are encrypted. Then, in step S4, the original control data which is not encrypted and the encrypted control data are transmitted to the cash input/output unit 50. If the cash input/output unit 50 is not authorized, the process is terminated without executing steps S3 and S4.

As described above, the control data are encrypted and transmitted to the cash input/output unit 50, only when the cash input/output unit 50 is authorized.

Figure 10:
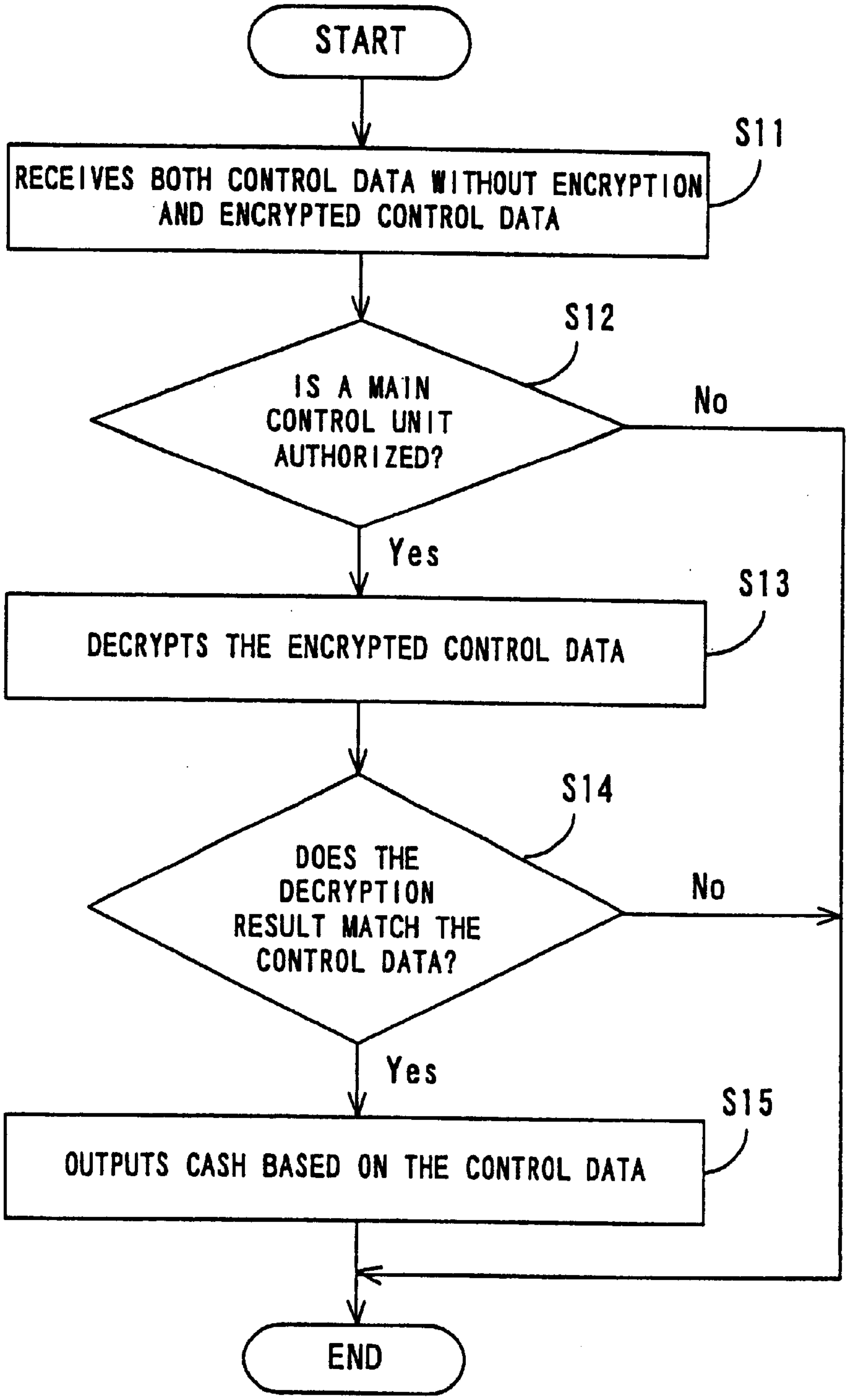
FIG. 10 is a flowchart showing the process of receiving encrypted control data in the cash input/output unit.

FIG. 10 is a flowchart showing the process of the cash input/output unit 50 at the time of the receipt of encrypted control data. In step S11, both plain control data and encrypted control data are received from the main control unit 50. In step S12, it is checked whether the main control unit 10 is correctly authorized. If the main control unit 10 is authorized, in step S13, the encrypted control data are decrypted. Then, in step S14, it is checked whether the decryption result obtained in step S13 matches the plain control data. If the two pieces of data match, in step S15, a cash output process is performed based on the control data. If the main control unit 10 is not authorized or if the decryption result obtained in step S13 does not match the plain control data, the process is terminated without executing step S15.

As described above, the cash input/output unit 50 performs a cash output process based on the control data, only when the main control unit 10 is authorized and control data are judged not to be altered.

When the above-described transaction-related process is completed, the automated teller's machine 1 issues the receipt of the transaction. The receipt is issued by the printer process unit 122.

In the automated teller's machine with the above-described configuration, if the initial keys used for encryption are periodically or non-periodically modified, it is difficult to decrypt the encryption and the security of a transaction can be further improved. The automated teller's machine 1 is provided with a function to automatically modify the initial keys.

As described above with reference to FIG. 3, the initial keys stored in the key storage unit 21 are updated by an update unit 22. The update unit 22 updates the initial keys in a timing when a trigger generated based on a parameter used inside the automated teller's machine 1 is received.

The "parameter used inside the automated teller's machine 1" includes, for example, information for identifying each transaction (transaction serial number), an amount designated by a user (amount information), the kind and number of bills and coins designated by a user, etc. If the "transaction serial number" is used, for example, a trigger is generated when the end two digits of the transaction serial number becomes "00". If the "amount information" is used, for example, the trigger is generated when the amount designated by a user exceeds a predetermined amount. If the trigger is generated by one of these methods, the initial keys are to be non-periodically modified and a timing when the initial keys are modified cannot be predicted. Accordingly, it is expected that the encryption can be enhanced.

If a trigger is generated, the update unit 22 updates the initial keys, and the main control unit 10 transmits a command to update the initial keys to the cash input/output unit 50.

Figure 11:
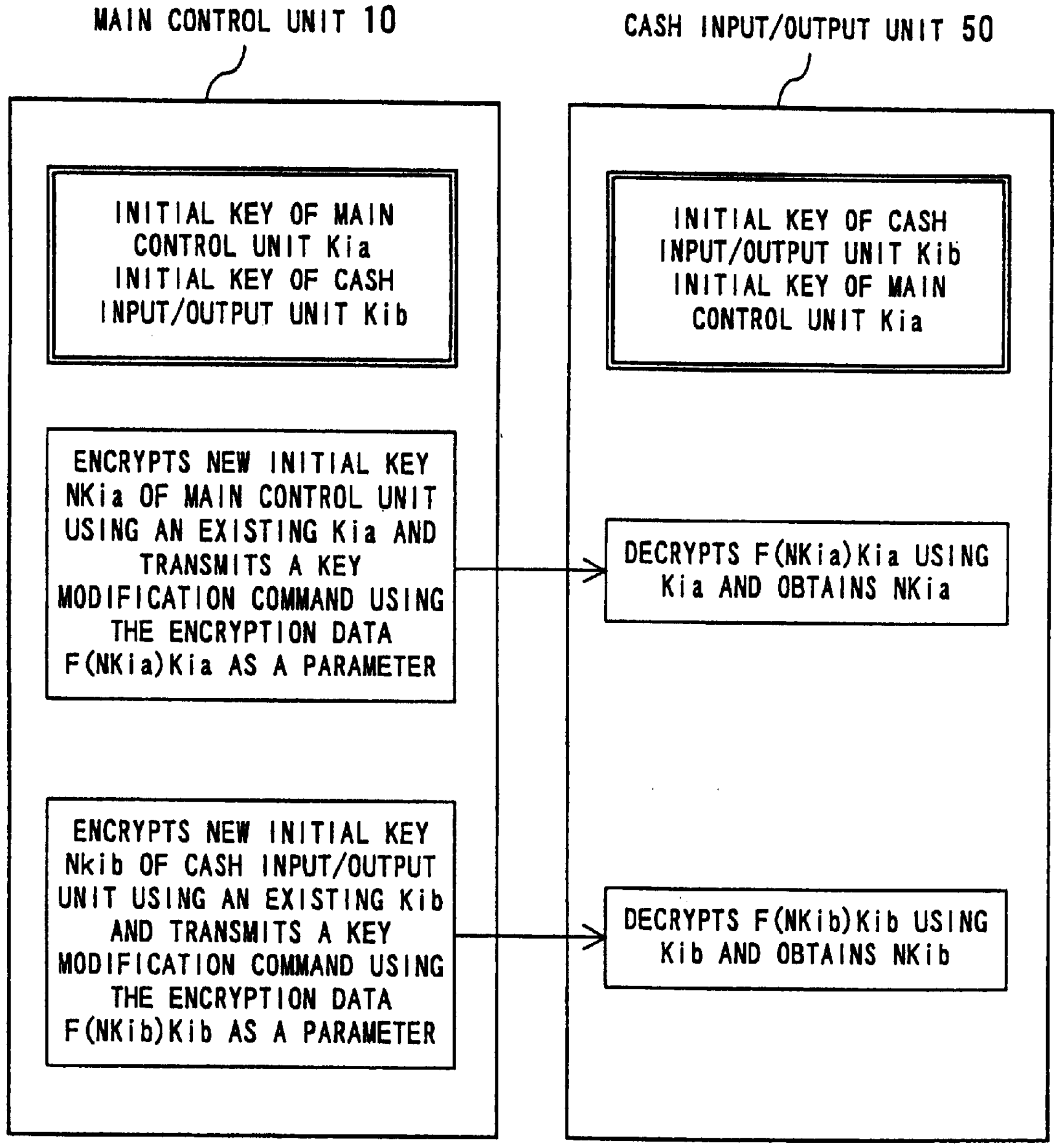
FIG. 11 shows the procedures for updating an initial key.

FIG. 11 shows the procedures for updating initial keys. Here, a case where the initial keys Kia and Kib are updated in the main control unit 10 and cash input/output unit 50, respectively, after a trigger for updating the initial keys is generated in the main control unit 10, is shown in this example.

The main control unit 10 generates a new initial key NKia. This initial key NKia is used instead of the initial key Kia in the future mutual authorization or encryption process. The production method of this key uses, for example, a random number, although it is not limited to a random number. It is preferable that even an administrator of the automated teller's machine must not know this initial key.

Then, the main control unit 10 obtains encryption data F(NKia)Kia by encrypting the new initial key NKia using the initial key Kia. Then, the main control unit 10 generates a command to modify an initial key using this encryption data F(NKia)Kia as a parameter and transmits the command to the cash input/output unit 50.

On receipt of this command, the cash input/output unit 50 decrypts the encryption data F(NKia)Kia using the initial key Kia stored in the key storage unit 61. The initial key NKia is obtained by this decryption process. Then, the initial key Kia stored in the key storage unit 61 is replaced with the initial key NKia.

The above-described update process can be applied to the update of the initial key Kib. However, if the initial key Kib is modified to the new initial key NKib, the main control unit 10 encrypts the new initial key NKib using the initial key Kib, and the cash input/output unit 50 obtains the new initial key NKib by decrypting the encryption data using the initial key Kib.

Although in the above-described preferred embodiment, a timing for updating an initial key is determined based on a parameter used inside the automated teller's machine 1, the initial key can also be updated based on another factor. For example, the administrator of the automated teller's machine 1 can determine the timing for updating the initial key.

Figure 12:
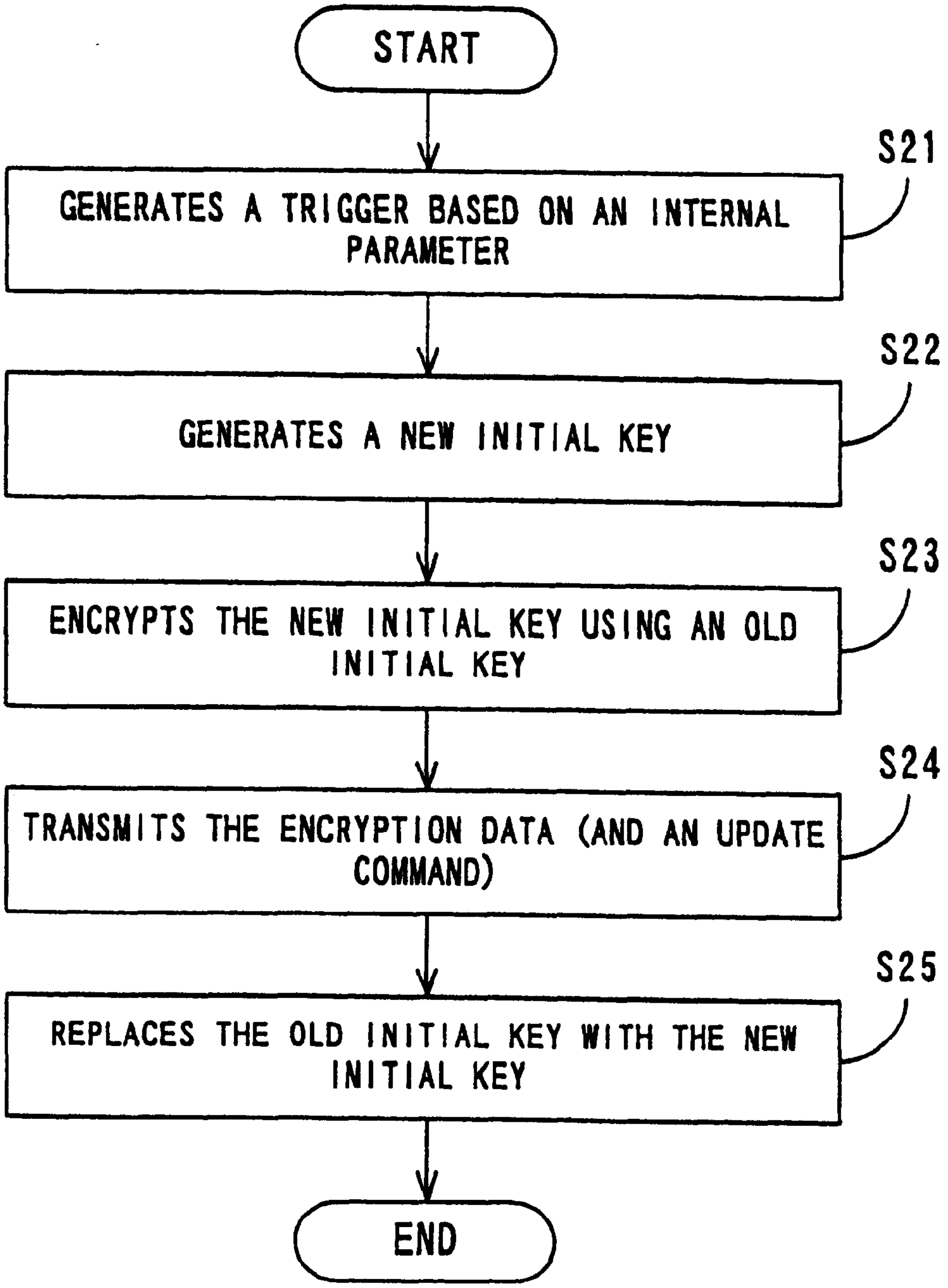
FIG. 12 is a flowchart showing the process of updating an initial key in the main control unit.

FIG. 12 is a flowchart showing the process of updating an initial key in the main control unit 10. In step S21, a trigger is generated based on a parameter used inside the automated teller's machine 1. In step S22, a new initial key is generated. In step S23, the new initial key is encrypted using the initial key (old initial key) stored in the key storage unit 21. In step S24, the encryption data generated in step S23 are transmitted to the cash input/output unit 50. At this time, the cash input/output unit 50 is provided with a command to update the initial key. Then, in step S25, the old initial key stored in the key storage unit 21 is replaced with the new initial key.

Figure 13:
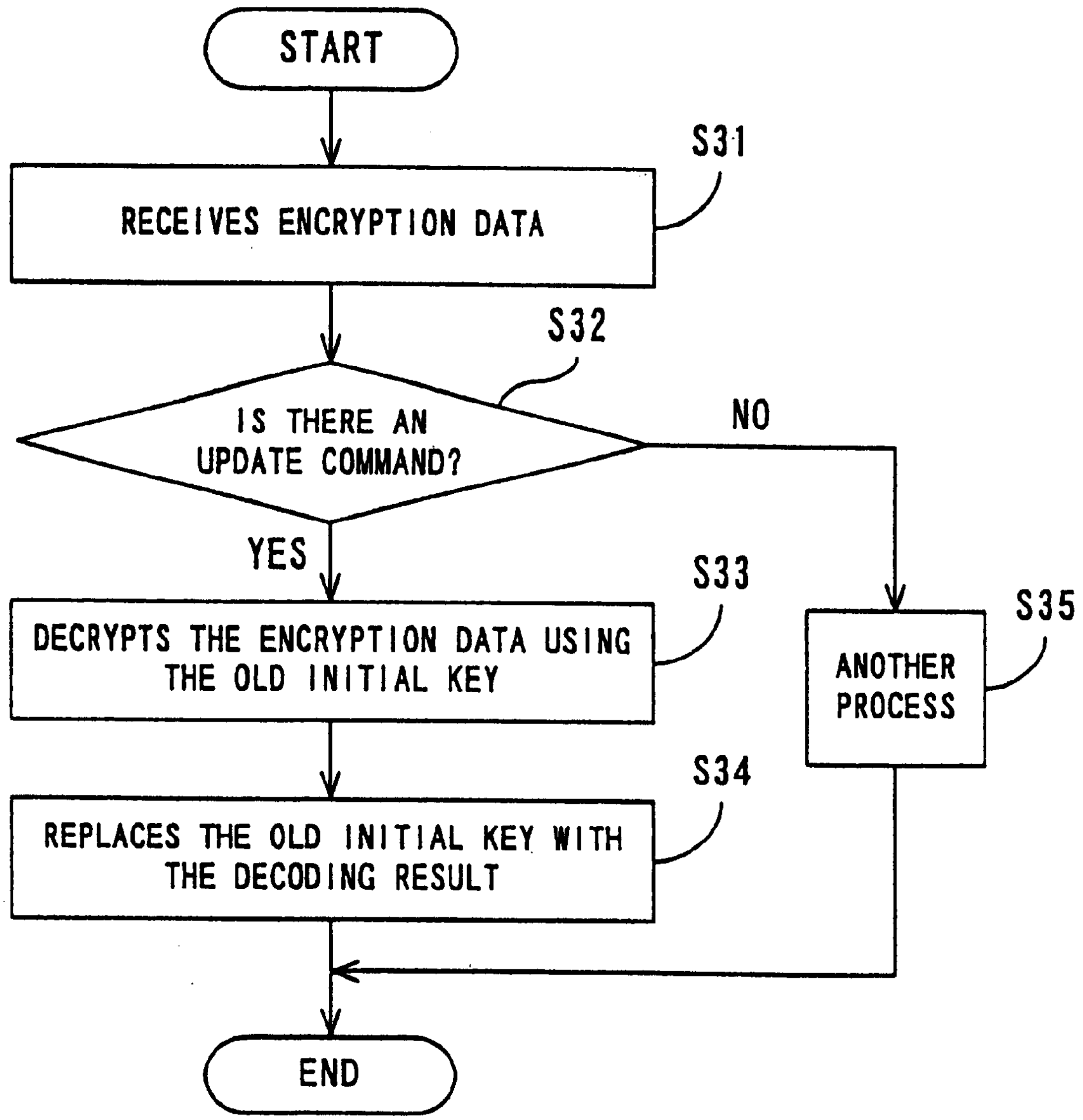
FIG. 13 is a flowchart showing the process of updating an initial key in the cash input/output unit.

FIG. 13 is a flowchart showing the process of updating an initial key in the cash input/output unit 50. If in step S31, encryption data are received, in step S32, a check is made as to whether a command to update an initial key is received. If the update command is received, in step S33, the encryption data received in step S31 is decrypted using the initial key (old initial key) stored in the key storage unit 61. Then, in step S34, the old initial key stored in the key storage unit 61 is replaced with the above-described decryption result. If the update command is not received, in step S35, corresponding process is performed.

Although in the above-described preferred embodiment, the operation in the case where a user withdraws cash from the automated teller's machine is used and a method for encrypting control data transmitted from the main control unit to the cash input/output unit is described, the automated teller's machine in this preferred embodiment can also encrypt transaction data generated when a user inputs cash. The operation in the case where a user deposits cash using the automated teller's machine is described below.

When inputting cash using the automated teller's machine 1, first a user selects "Deposit" for a transaction to be performed. Then, the user inserts his cash card or passbook according to the guidance of the user interface unit 101 and inputs cash to be deposited.

The cash input control unit 52 of the automated teller's machine 1 recognizes the total amount of the cash inputted by the user and notifies the main control unit 10 of the recognition result as transaction data. At this time, the cash input/output unit 50 encrypts the transaction data.

Figure 14:
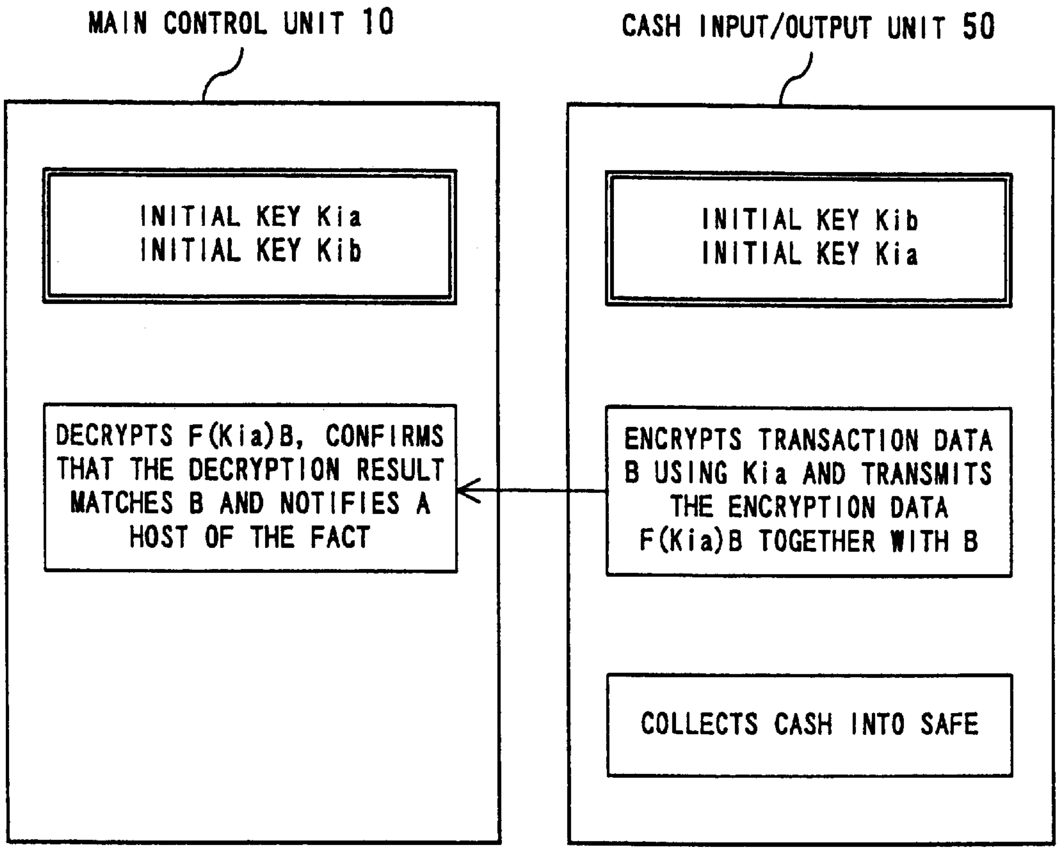
FIG. 14 shows the encryption procedures at the time of deposit.

FIG. 14 shows the encryption procedures between the main control unit 10 and cash input/output unit 50 at the time of cash input. A case where transaction data B are encrypted and transmitted from the cash input/output unit 50 to the main control unit 10 is shown in this example. The transaction data B include information indicating the amount of cash recognized by the cash input control unit 52.

The cash input/output unit 50 generates encryption data F(Kia)B by encrypting the transaction data B using the initial key Kia. This encryption process is performed by the encrypting unit 62 shown in FIG. 4. Then, the cash input/output unit 50 transmits both the original transaction data B and the encryption data F(Kia)B obtained by encrypting the transaction data B to the main control unit 10.

On receipt of both the transaction data B and encryption data F(Kia)B, the main control unit 10 decrypts the encryption data F(Kia)B using the initial key Kia stored in the key storage unit 21. This decryption process is performed by the decrypting unit 25 shown in FIG. 3. Then, the transaction data B transmitted from the cash input/output unit 50 and the decryption result obtained by decrypting the encryption data F(Kia)B are compared. In this case, if the two pieces of data match, the main control unit 10 judges that the transaction data B are not altered, transmits a confirmation notice to the cash input/output unit 50 and notifies the host 111 of the contents of the transaction data B. If the above-described two pieces of data do not match, the main control unit 10 judges that there is a possibility that the transaction data B may be altered and, for example, transmits a transaction stop instruction to the cash input/output unit 50.

On receipt of the confirmation notice from the main control unit 10, the cash input/output unit 50 collects the cash inputted by the user and deposits it into the safe 53. On receipt of the transaction stop instruction, the cash input/output unit 50 does not accept the inputted cash.

Although in the above-described preferred embodiment, an automated teller's machine is used, the present invention is not limited to an apparatus handling "cash". Specifically, for example, if in an apparatus handling electronic money, a device for performing information processing related to a financial transaction and a device for inputting electronic money to the electronic purse (IC card, etc.) of a user are separated and if there is a transmission line for transmitting/receiving information between the two devices, the mutual authorization method and encryption method are considered to be useful.

According to the automated teller's machine of the present invention, since mutual authorization is performed between a device for performing a transaction and a device for inputting/outputting cash inside the apparatus, security can be improved. In addition, since information transmitted/received between the device for performing a transaction and the device for inputting/outputting cash is encrypted, the security of the automated teller's machine is further improved.

What is claimed is:

1. An automated teller's machine for outputting cash according to a given instruction, comprising:

a controller generating control data including information indicating an amount to be outputted according to a given instruction; and a cash output unit storing cash and outputting cash based on the control data generated by said controller, wherein mutual authorization is performed between said controller and said cash output unit.

2. The automated teller's machine according to claim 1, wherein said controller comprises:

a first random number generation unit generating a first random number and transmitting the first random number to said cash output unit;

a first decrypting unit decrypting first encryption data using a first key, said first encryption data being obtained by encrypting the first random number using the first key in said cash output unit; and a first authorization unit authorizing said cash output unit based on the first random number and a decryption result of said first decrypting unit, and said cash output unit, comprises:

a second random number generation unit generating a second random number and transmitting the second random number to said controller;

a second decrypting unit decrypting second encryption data using a second key, said second encryption data being obtained by encrypting the second random number using the second key in said controller; and a second authorization unit authorizing said controller based on the second random number and a decryption result of said second decrypting unit.

3. The automated teller's machine according to claim 2, wherein said controller comprises a first storage unit storing the first and second keys, and said cash output unit comprises a second storage unit storing the first and second keys, wherein the first and second storage units are synchronously updated based on a parameter used inside this automated teller's machine.

4. An automated teller's machine which is connected to a host device for managing accounts of customers and accepts inputted cash, comprising:

a cash input unit recognizing inputted cash and generating transaction data including information indicating an amount of the cash; and a controller generating cash input information for updating a deposit amount of an account corresponding to a customer who inputs the cash based on the transaction data generated by the cash input unit, and transmitting the cash input information to the host device, wherein mutual authorization is performed between said cash input unit and said controller.

5. An automated teller's machine for outputting cash according to a given instruction, comprising:

a controller generating control data including information indicating an amount of cash to be outputted according to a given instruction; and a cash output unit storing cash and outputting cash based on the control data generated by said controller, wherein the control data are encrypted according to a predetermined algorithm and transmitted from said controller to said cash output unit.

6. The automated teller's machine according to claim 5, wherein said controller comprises:

a first storage unit storing an encryption key; and an encrypting unit encrypting the control data using the encryption key stored in said first storage unit, and said cash output unit comprises:

a second storage unit storing a same encryption key as the encryption key stored in the first storage unit; and a decrypting unit decrypting the control data encrypted by said encrypting unit using the encryption key stored in said second storage unit.

7. An automated teller's machine which outputs cash according to a given instruction, comprising:

a controller generating control data including information indicating an amount of cash to be outputted according to a given instruction;

a cash output unit storing cash and outputting cash based on the control data generated by said controller; and an encrypting unit encrypting the control data according to a predetermined algorithm and transmitting the encrypted control data from said controller to said cash output unit.

8. An automated teller's machine which is connected to a host device for managing accounts of customers and accepts inputted cash, comprising:

a cash input unit recognizing inputted cash and generating transaction data including information indicating an amount of the cash; and a controller generating cash input information for updating a deposit amount of an account corresponding to a customer who inputs the cash based on the transaction data generated by said cash input unit, and transmitting the cash input information to the host device, wherein the transaction data are encrypted according to a predetermined algorithm and transmitted from said cash input unit to said controller.

9. An automatic cash transaction method for outputting cash according to a given instruction, in which mutual authorization is performed between a controller generating control data including information indicating an amount of cash to be outputted according to a given instruction and a cash output unit outputting cash based on the control data prior to performing of a financial transaction.

10. An automatic cash transaction method for outputting cash according to a given instruction, wherein generating control data including information indicating an amount of cash to be outputted according to a given instruction;

encrypting the control data according to a predetermined algorithm;

transmitting the encryption data from a controller which generates and encrypts the control data to a cash output unit;

decrypting, by the cash output unit, the encryption data; and outputting cash based on the decryption result.

11. An automated teller's machine for outputting cash according to a given instruction, comprising:

control means for generating control data including information indicating an amount to be outputted according to a given instruction; and cash outputting means for storing cash and outputting cash based on the control data generated by said control means, wherein mutual authorization is performed between said control means and said cash outputting means.

12. An automated teller's machine for outputting cash according to a given instruction, comprising:

control means for generating control data including information indicating an amount of cash to be outputted according to a given instruction; and cash outputting means for storing cash and outputting cash based on the control data generated by said control means, wherein the control data are encrypted according to a predetermined algorithm and transmitted from said control means to said cash outputting means.

* * * * *